(12) United States Patent
Braedt

(10) Patent No.: US 8,882,619 B2
(45) Date of Patent: Nov. 11, 2014

(54) SPROCKET FOR REAR WHEEL OF A BICYCLE

(75) Inventor: Henrik Braedt, Gebrunn (DE)

(73) Assignee: SRAM Deutschland GmbH, Schweinfurt (DE)

( * ) Notice: Subject to any disclaimer, the term of this patent is extended or adjusted under 35 U.S.C. 154(b) by 362 days.

(21) Appl. No.: 13/418,080

(22) Filed: Mar. 12, 2012

(65) Prior Publication Data

US 2013/0072334 A1 Mar. 21, 2013

(30) Foreign Application Priority Data

Mar. 11, 2011 (DE) .......................... 10 2011 013 695

(51) Int. Cl.
*F16H 7/06* (2006.01)
*B62M 9/10* (2006.01)

(52) U.S. Cl.
CPC ... *F16H 7/06* (2013.01); *B62M 9/10* (2013.01)
USPC ........................................................ 474/156

(58) Field of Classification Search
CPC .................................. B62M 9/10; F16H 7/06
USPC ...................... 474/152–158, 160–164
See application file for complete search history.

(56) References Cited

U.S. PATENT DOCUMENTS

| 5,192,249 | A | 3/1993 | Nagano | |
|---|---|---|---|---|
| 5,437,582 | A | 8/1995 | Romano | |
| 5,464,373 | A | 11/1995 | Leng | |
| 5,514,042 | A | 5/1996 | Liou | |
| 5,545,096 | A * | 8/1996 | Su | 474/160 |
| 5,716,297 | A | 2/1998 | Bodmer | |
| 5,876,296 | A | 3/1999 | Hsu et al. | |
| 6,139,456 | A * | 10/2000 | Lii et al. | 474/152 |
| 6,340,338 | B1 * | 1/2002 | Kamada | 474/160 |
| 6,923,741 | B2 * | 8/2005 | Wei | 474/160 |
| 7,846,047 | B2 * | 12/2010 | Nakano et al. | 474/152 |
| 8,517,874 | B2 * | 8/2013 | Reiter | 474/160 |
| 2005/0282672 | A1 * | 12/2005 | Nonoshita | 474/161 |
| 2006/0154767 | A1 * | 7/2006 | Kamada | 474/160 |
| 2008/0132367 | A1 * | 6/2008 | Braedt | 474/161 |
| 2009/0069135 | A1 * | 3/2009 | Chiang | 474/164 |
| 2009/0082147 | A1 * | 3/2009 | Braedt | 474/160 |
| 2009/0258740 | A1 * | 10/2009 | Valle | 474/160 |
| 2011/0092327 | A1 * | 4/2011 | Oishi | 474/160 |

FOREIGN PATENT DOCUMENTS

| DE | 44 18 407 | 1/2002 |
|---|---|---|
| EP | 1188658 | 11/2005 |

* cited by examiner

*Primary Examiner* — William E Dondero
*Assistant Examiner* — Robert T Reese
(74) *Attorney, Agent, or Firm* — Milan Milosevic; Lisa Serdynski; Steven Courtright

(57) ABSTRACT

The present invention relates to a sprocket for use with a bicycle, the sprocket for use with a multi-sprocket assembly and chain, wherein the sprocket is made from a light but comparatively soft material and does not have shifting aids in the form of recesses and notches on the sprocket teeth where the chain rollers are in contact with the load flanks of the teeth.

9 Claims, 4 Drawing Sheets

SPROCKET FOR REAR WHEEL OF A BICYCLE

BACKGROUND OF THE INVENTION

The invention relates to a sprocket for a drive unit at the rear wheel of a bicycle. The sprocket may be one or more of a multi-sprocket assembly, wherein the multi-sprocket assembly may be installed on a freewheel body at the rear wheel hub of the bicycle and is drivable by a chain, such as a roller chain.

A freewheel body is formed by a driver of a cassette hub or by an outer ring of a freewheel that can be screwed to the hub sleeve. The ring is rotatably supported with respect to the hub axle and has a rotary coupling in the forward direction of rotation with respect to a hub sleeve and is freely rotatable in the backward direction of rotation with respect to the hub sleeve.

Sprockets at the rear wheel are main parts of the drive train of modern mountain bikes and road racing bicycles. Today, up to eleven sprockets are offered in a multi-sprocket assembly.

Sprockets belong to the group of highly stressed components and are parts that are subject to wear. Conventional sprockets comprise at their radially inner contour a drive profile at which a driving connection to a driver of a cassette hub or to the outer ring of a freewheel is established. The allocation of adjacent sprockets to each other in the circumferential direction, which is of vital importance during the process of shifting the chain from one sprocket to the adjacent sprocket, is determined by how the drive profiles of the sprockets are in engagement with the driver or the outer ring of the freewheel.

A new development trend in terms of multi-sprocket assemblies is weight reduction. In order to achieve this object while fulfilling the mentioned basic requirements, sprocket components are made from a lightweight material, e.g., from aluminum. The disadvantage here is the low hardness and the lower resilience against compressive forces on the component surface. This aspect has primarily an effect where the contact areas absorbing the compressive forces are made smaller with regard to their spatial expansion as this is the case for different types of shifting aids for supporting the shifting function along a shifting path. A shifting path extends along the roller chain changing from a sprocket to an adjacent sprocket, namely for shifting the chain from the smaller sprocket to the adjacent larger one (axially inwardly), one as well as from the larger sprocket to the adjacent smaller one (axially outwardly). Thereby, portions of the sprocket are omitted which are necessary for the engagement and the contact between a roller of the drive roller chain and the load-transmitting tooth flank. The features formed by omitting parts of the sprocket comprise shifting aids.

Thereby, a higher wear occurs on the thinner, weakened teeth which when using sprockets made of aluminum, for example, exceeds rapidly a threshold above which a reliable operation of the sprocket is no longer ensured.

SUMMARY OF THE INVENTION

It is therefore an object of the present invention to provide a sprocket made of a material softer than steel with shifting aids in such a manner that only a still acceptable wear occurs. This object is achieved in that shifting aids are arranged on the teeth contacting the roller chain in such a manner that no or only minimal shortfalls occur on the contact area. A basic consideration here is the approach to allow shifting of the roller chain, which consists of an alternating sequence of outer links and inner links, only in certain situations.

In the case of conventional steel sprockets, the shifting aids allow shifting processes if during the shifting process an outer link as well as an inner link is positioned in the axial direction adjacent to a reference tooth, thus, two different chain link plate/tooth allocations are given.

In contrast to that, with the approach according to the invention, shifting paths are not provided for both chain link plate/tooth allocations at the circumferential positions in which advantageous relative positions between the teeth on the smaller sprocket and the adjacent larger sprocket are given with a distance of the mentioned teeth from each other that corresponds to the integer multiple of the chain pitch. In the case of the sprocket according to the invention, shifting processes are only allowed if an inner link plate rests against a predetermined reference tooth.

The approach of avoiding the engagement of the chain with an outer link at an advantageously positioned reference tooth in connection with a suitable configuration of shifting paths or with the omission of shifting paths at advantageous relative positions has already been implemented for multi-sprocket assemblies; however, with a different configuration and objective than in the case of the present invention.

In EP 1 522 490, a specific tooth is deliberately designed in such a manner that no engagement with the outer link plate of an outer link can occur.

This tooth, due to a fulfilled requirement regarding its distance from the last tooth still engaged with the smaller sprocket, would be most suitable for the engagement of an outer link plate of the chain with this tooth. With this design concept, it was possible to provide instead of single and large embossment, a plurality of embossments on the sprocket as part of the shifting path for the two situations of allocations of either an outer link plate to the tooth in question or an inner link plate on this tooth.

In EP 1 188 658, this shifting path of a sprocket was completely omitted at a position at which a shifting path for shifting up from the smaller adjacent sprocket to the respective sprocket was present in order to make space for providing a shifting path from the respective sprocket down to the adjacent smaller sprocket.

In contrast to this, the configuration of a sprocket according to the invention is intended to achieve a large contact area for the contact between chain roller and load flank. For this purpose, the sprocket teeth generally have a great thickness in the direction perpendicular to their main extension plane, and the weakening of the load flanks of the teeth along shifting paths is reduced to a minimum.

Moreover, the shifting path is designed only for the case of engagement in which an inner link is allocated to a reference tooth. In the other case in which an outer link is allocated to the reference tooth, the shape of the teeth prevents the chain from shifting onto the sprocket. For this, the reference tooth comprises chamfers which prevent an engagement of an outer link plate.

In the case of the sprocket configuration according to the invention, during the change of the chain from a smaller to a larger sprocket, an outer link is supported radially inward on a reference tooth by the edge of a recess and is lifted to a greater radial level. The recess does not reach to the load flank and does not influence the same. During the normal engagement between the roller chain and the reference tooth without a shifting process during which a contact between chain roller and load flank takes place and a force is transmitted, accordingly, a large contact area is available to the chain roller. The base or edge of the recess extends in the preferred embodiment up to the tip of the tooth. In the circumferential direction, the recess has an extension up to the next tooth that follows in the direction of rotation.

This shape of the recess is complemented by the configuration of teeth following in the opposite direction of rotation, wherein flutes or notches on the teeth are provided only radially outside of the contact areas between chain roller and load flank.

Purely geometrical similarities exist between the recesses and notches according to the invention on the one hand, and recesses in U.S. Pat. Nos. 5,464,373 and 5,876,296 on the other, where, however, the provision of recesses results in a significant reduction of the contact area between chain roller and load flank.

Similarities with regard to the support of the outer link plate of the chain on an edge of a recess exist also in DE 44 18 407. However, here too, it is not intended to maintain an unharmed load flank.

An embodiment of a sprocket according to the invention will be described in the following with the use of figures.

DETAILED DESCRIPTION OF A PREFERRED EMBODIMENT

Figure 1:
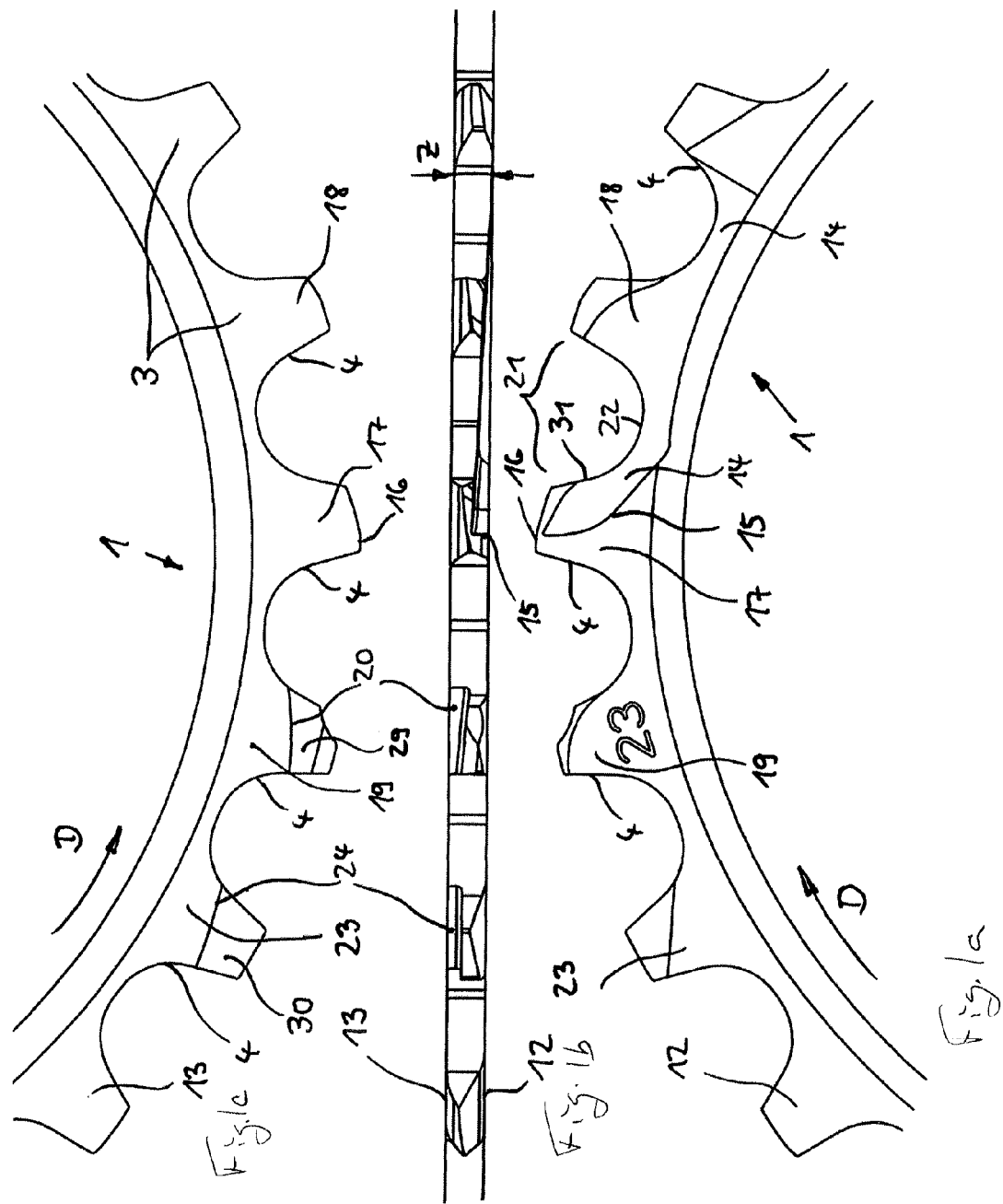
FIGS. 1a-c is a sprocket according to an embodiment of the invention, viewed from the side of an adjacent smaller sprocket (at the bottom in the illustration—FIG. 1a), from radially outside (in the middle of the illustration—FIG. 1b), and from the side that faces away from the adjacent smaller sprocket (at the top in the illustration—FIG. 1c)
Figure 2:
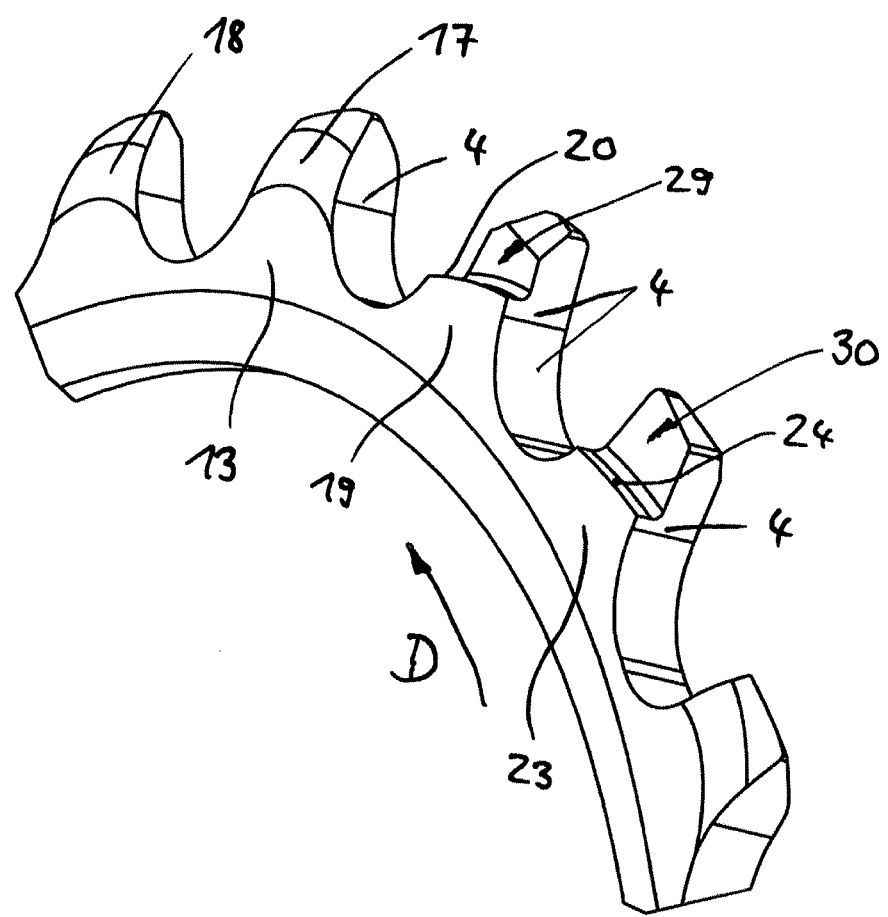
FIG. 2 is the sprocket of FIG. 1, viewed diagonally from the side which faces away from the adjacent smaller sprocket.
Figure 3:
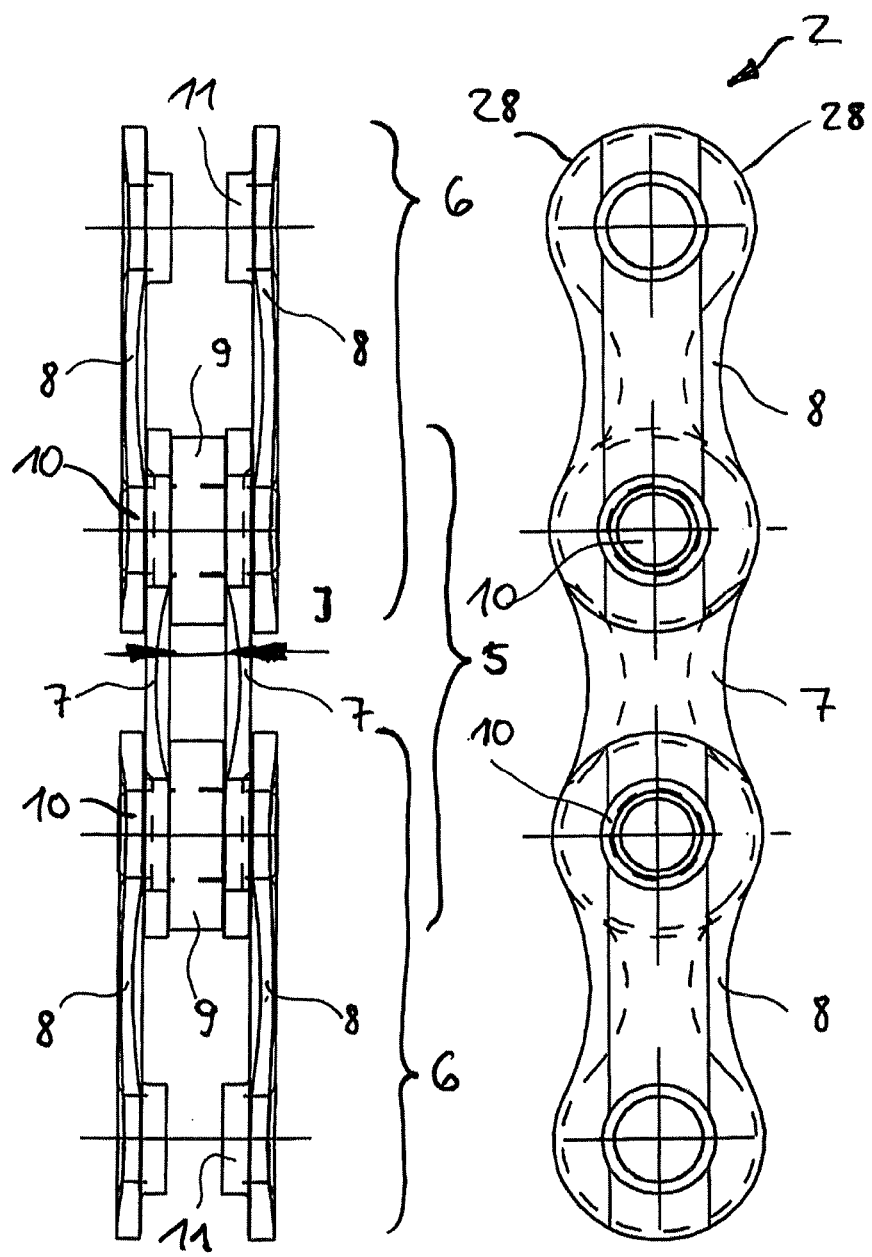
FIGS. 3a-b is a conventional roller chain, in the left illustration—FIG. 3a—viewed parallel to the direction of the plane in which the chain link plates extend, and in the right illustration—FIG. 3b—viewed in a direction parallel to the center axis of the chain pins.

FIGS. 1a-c and FIG. 2 show a recess 14 on the side 12 of the sprocket 1, wherein the side faces or is oriented toward an adjacent smaller sprocket or axially outwardly from a wheel when mounted thereto. The side 12 of the sprocket will also be referred to as the first side. An edge 15 of the recess 14 extends up to the tooth tip 16 on a reference tooth. The edge 15 may also be referred to as a recess base of the recess 14 and defines a boundary of the recess. This reference tooth may be designated as a support tooth 17, or a first tooth, because it supports the chain with the recess 14 on the first side 12 of the sprocket 1. There, the outer curvature 28 of the outer link plate 8 shown in FIG. 3a, 3b, which is concentric to the center axis of the chain pin 10, lays in the recess 14 and, when sufficient forces are applied, is supported radially inward also with regard to the sprocket 1. The band-shaped surface, i.e., the course of the recess base 15 has an adequate width which is perpendicular to the first side 12 of the sprocket 1 and corresponds to the axial depth of the recess 14. The outer link plate 8 is brought into this position during the shifting of the chain 2 to the sprocket 1 in question. The depth of the recess 14 may decrease toward its forward end in the drive D direction. The recess 14 has an extension or extent corresponding to the space that is required by the outer link plate 8 which is positioned at an angle during shifting. In the illustrated exemplary embodiment, the recess 14 extends from the first or support tooth 17 beyond the deflector tooth 18, or fourth tooth, following in the direction D of rotation and up to the load flank 4 of the tooth following the fourth tooth in the direction D.

During the engaging process of the chain links 5, 6 with the sprocket teeth 3, the chain links move from radially outward successively toward the first tooth 17 with the recess base 15, toward an outer link plate tooth 19, or second tooth, and toward an inner link plate tooth 23, or third tooth. The first tooth 17, the second tooth 19, and the third tooth 23 form a sequence of teeth in the opposite direction D of rotation of the sprocket 1. When the outer curvature 28 of the chain 2 is supported on the recess base 15, an inner link plate 7 is positioned at the side of the first tooth 17 which corresponds to the first side 12 of the sprocket 1. The chain's outer link plate 8 following the viewed inner link plate in the opposite direction D of rotation of the sprocket 1 reaches over the second tooth 19 so that the second tooth is positioned between a pair of outer link plates 8 of the respective outer link 6. Thus, this outer link plate 8 is closer to the second side 13 on the sprocket, which is located opposite to the first side 12, than the outer link plate that has its end region located at the first tooth 17 in the recess 14 on the first side of the sprocket. This corresponds to the direction of the chain's shifting from the smaller sprocket to the larger sprocket.

Extending from the second side 13 of the sprocket, the second tooth 19 has a second tooth notch 29 into which the outer link plate is received and in doing so, abuts radially inward against a second tooth notch base 20. On the second side 13 of the third tooth 23, a third tooth notch 30 is formed into which an inner link plate 7 is received and abuts against a third tooth notch base 24.

The provision of the recess 14, the second tooth notch 29 and the third tooth notch 30 on successive teeth 17, 19 and 23 corresponds to the possibilities of the chain for bending in a direction perpendicular to the first side 12 of the sprocket 1 when shifting the chain. Space is provided for all those parts of the chain which could collide with the sprocket teeth. Therefore, the further parts of the teeth outside of the recess 14, the second tooth notch 29 and the third tooth notch 30 can be formed thicker, which corresponds to an increase of the distance between the first side 12 and the second side 13 and therefore corresponds to an increase of the tooth thickness Z. This increase of the distance between the first side 12 and the second side 13 also comes directly into effect as an increase of the contact areas between the chain rollers 9 and the load flanks 4 on the sprocket teeth 3 because no shifting aids end in, intrude into or compromises the tooth thickness of these contact areas. The recess 14 on the first tooth 17, and the second tooth notch 29 and the third tooth notch 30 do not end in or intrude into the contact areas.

During the engagement between chain 2 and sprocket teeth 3 without a shifting process, the tooth thickness Z is determined by the distance I between the inner link plates 7, reduced by a standard correction value. This correction value is to be included because it should always be possible that teeth can enter into the gap between the inner link plates. Thickness Z may be the maximum tooth thickness where the roller 9 contacts the load flank 4 in at least the first, second and third teeth (17, 19, 23).

The tooth thickness Z may also be selected so as to increase from radially outside to radially inside which is particularly important when manufacturing the sprocket by means of a turning operation.

The sprocket according to the invention is particularly suitable for use as the largest end sprocket of a multi-sprocket assembly. In this case, this end sprocket can also have a well-known drive profile (not-shown) with engagement elements for transmitting the force received from the chain to a driver on a rear wheel hub. A described sprocket can be used in connection with further single sprockets of a multi-sprocket assembly that are punched out of sheet metal. However, also beneficial is a use together with a plurality of sprockets integrally connected in a single-piece conical support structure. For this, a connection by means of connecting pins is possible.

Sprockets according to the invention can also be smaller ones of a plurality of sprockets of a multi-sprocket assembly. However, in this case, further functions have to be implemented with shifting aids which disturb the overall concept, for example during shifting from a respective sprocket to the next larger adjacent sprocket. Also, shifting delays occur to a greater degree because due to smaller differences in the number of teeth between the adjacent sprockets, less shifting paths can be arranged and because these shifting paths, with a probability of 50 percent, are also not suitable and designed for the chain link (inner chain link or outer chain link) resting against the reference tooth for shifting the chain.

The described embodiment relates to the shifting of the chain onto a sprocket, the adjacent or next smaller sprocket being the starting point.

With adequate adaptations for the measures in terms of the shaping of the teeth, the approach according to the invention can also be used for the smallest sprocket of a multi-sprocket assembly. The adaptation relates in particular to the shifting of the chain onto the smallest end sprocket, the next larger sprocket being the starting point.

Alternative modifications of the concept can include that the recess base 15 on the first tooth 17 extends from the tooth tip 16 up to a point on the non-load flank 31. However, in the case of such a configuration, the chain link to be supported will be supported in a correspondingly less secure manner.

Another possibility of a modification is to arrange the recess 14 primarily in the space 21 between the teeth, namely at the bottom or the tooth root 22 of the space 21 between the teeth. This modification has the disadvantage that there are more limiting conditions in terms of the shape of the second tooth notch 29 and the third tooth notch 30. The second tooth notch base 20 and the third tooth notch base 24 should then be arranged at a radial position located farther inside at which the contact area between chain roller and load flank is already located, which results in a reduced contact area.

With an adequate adaptation, the principle illustrated according to the structural conditions for a sprocket on a rear wheel of a bicycle can also be used for a chain wheel of a multi-chain wheel assembly on a crank device on a bicycle.

Figure 4:
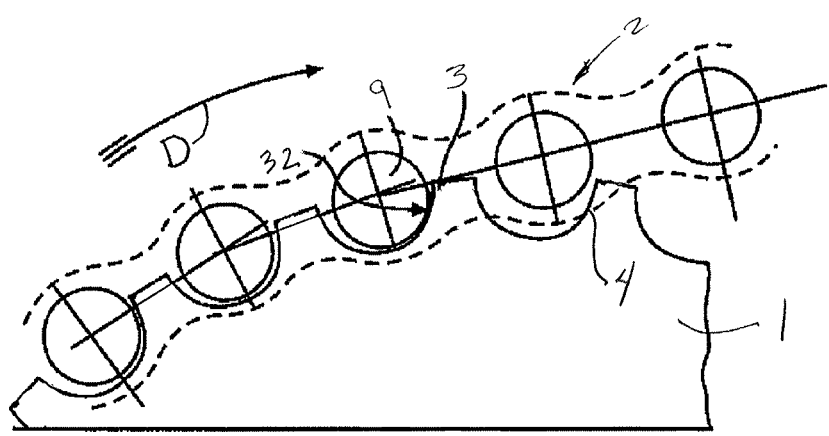
FIG. 4 is the roller chain of FIG. 3 engaged with a sprocket.

Referring to FIG. 4, sprocket 1 is shown with chain 2 in position and engaged with the teeth 3 of the sprocket. In particular, sprocket 1 includes a contact point 32 where each roller 9 of the chain 2 engages the sprocket on the load flank 4 of each tooth in the drive direction D. As explained above, the teeth 3 of the sprocket 1 may be a maximum width Z at the contact point 32, due to the construction of the sprocket according to the inventive concepts described herein.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A sprocket engageable with a chain having successive alternating pairs of inner link plates and outer link plates connected by pins, the pins encased by rollers, the sprocket comprising:
    a plurality of sprocket teeth on the outer periphery of the sprocket, each of the teeth having a tip and a root, a load flank for contacting the chain, a non-load flank, and a first side and a second side opposite the first side;
    a first tooth of the plurality of teeth including a recess formed on the first side of the first tooth; and
    a second tooth and a third tooth of the plurality of teeth sequentially adjacent to and preceding the first tooth in a non-drive direction of the sprocket, each of the second tooth and the third tooth having a notch on the second side for providing space for the chain when shifted from a smaller adjacent sprocket onto the sprocket for the purpose of gear shifting and for providing contact areas for contact with the inner and outer link plates of the chain;
    wherein the recess extends one or both of to the tooth tip and to the non-load flank of the first tooth, but not to the load flank of the first tooth, and includes a recess base configured to contact and support an outer link plate of the chain, wherein the recess is configured to receive a portion of the outer link plate and extends at least along the first side of a fourth tooth of the plurality of teeth adjacent to the first tooth in a drive direction of the sprocket.

2. The sprocket of claim 1, wherein the load flank of the first tooth is a maximum tooth width.

3. The sprocket of claim 2, wherein the notch of the second tooth includes a second tooth notch base which extends in the circumferential direction and is configured to support an outer link plate.

4. The sprocket of claim 3, wherein the second tooth notch base is located approximately in a position radially centered between the tip and the root and extends to the load flank of the second tooth above a contact point of a roller of the chain with the load flank.

5. The sprocket of claim 2, wherein the notch of the third tooth includes a third tooth notch base which extends in the circumferential direction and is configured to support an inner link plate.

6. The sprocket of claim 5, wherein the third tooth notch base is located approximately at a position radially centered between the tooth tip and the root and extends to the load flank of the third tooth and above a contact point of the roller of the chain with the load flank.

7. The sprocket of claim 1, wherein the recess of the first tooth receives a correspondingly shaped outside surface of the outer curvature of the outer link plate of the chain such that the first tooth cannot engage between the outer link plates of the chain.

8. The sprocket of claim 1, wherein the spaces between adjacent ones of the plurality of teeth are slightly longer than an outer diameter of a roller of the chain, and each is at least large enough to receive a roller positioned at an angle corresponding to the angular course of the chain running onto the sprocket during a gear change.

9. The sprocket of claim 1, wherein the sprocket has a drive profile for transferring the force from the sprocket to a rear wheel hub part arranged radially on an inner periphery.

* * * * *